United States Patent [19]

Lasecki et al.

[11] Patent Number: 5,042,847
[45] Date of Patent: Aug. 27, 1991

[54] METAL TO CERAMIC SEALED JOINT

[75] Inventors: John V. Lasecki, Livonia; Robert F. Novak, Farmington Hills; James R. McBride, Ypsilanti, all of Mich.

[73] Assignee: Ford Motor Company, Dearborn, Mich.

[21] Appl. No.: 382,367

[22] Filed: Jul. 20, 1989

[51] Int. Cl.$^5$ .................. E21B 19/00; B23K 31/02
[52] U.S. Cl. .................... 285/138; 285/287; 285/331; 285/422; 228/122; 228/263.12
[58] Field of Search ............. 285/287, 138, 923, 331, 285/422, 911; 228/122, 263.12, 124

[56] References Cited

U.S. PATENT DOCUMENTS

| | | | |
|---|---|---|---|
| 495,240 | 4/1893 | Benjamin | 313/317 |
| 1,842,298 | 1/1932 | Smith | 285/55 |
| 2,366,579 | 1/1945 | Von Ahrens | 285/22 |
| 2,458,722 | 1/1949 | Nesset et al. | 285/911 X |
| 2,605,435 | 7/1952 | Krasnow | 313/93 |
| 2,629,093 | 2/1953 | Pask et al. | 220/2.3 R |
| 2,650,683 | 9/1953 | McPhee et al. | 403/28 |
| 2,769,563 | 11/1956 | Weil | 220/468 |
| 2,773,301 | 12/1956 | Karmazin | 29/890.047 |
| 2,859,372 | 11/1958 | Stangl | 313/250 |
| 2,918,596 | 12/1959 | Dijksterhuis et al. | 313/257 |
| 2,993,617 | 7/1961 | Briggs | 220/468 |
| 2,996,401 | 8/1961 | Welch et al. | 427/106 |
| 3,024,300 | 3/1962 | Martin | 285/911 X |
| 3,061,664 | 10/1962 | Kegg | 174/50.53 |
| 3,214,833 | 11/1965 | Erickson | 228/122 |
| 3,281,174 | 10/1966 | Heil | 403/179 |
| 3,366,852 | 1/1968 | Goetzel | 361/279 |
| 3,376,121 | 4/1968 | Lawrence | 428/632 |
| 3,439,858 | 4/1969 | Ando et al. | 228/56.3 |
| 3,632,009 | 1/1972 | Borromco | 220/5 A |
| 4,009,027 | 2/1977 | Naidich et al. | 228/122 X |
| 4,037,027 | 7/1977 | Desplanches et al. | 228/122 X |
| 4,049,877 | 9/1977 | Saillant et al. | 429/11 |
| 4,098,958 | 7/1978 | Bettman | 429/17 |
| 4,140,239 | 1/1979 | Mercier et al. | 220/319 |
| 4,215,466 | 8/1980 | Bindin | 228/122 X |
| 4,281,763 | 8/1981 | Pace | 206/530 |
| 4,396,213 | 8/1983 | Hawkins | 285/287 |
| 4,426,033 | 1/1984 | Mizuhara | 228/122 X |
| 4,510,210 | 4/1985 | Hunt et al. | 429/11 |
| 4,562,121 | 12/1985 | Thiemann et al. | 428/607 |
| 4,667,871 | 5/1987 | Mizuhara | 228/263.12 X |
| 4,714,798 | 12/1987 | Novak et al. | 136/239 |

FOREIGN PATENT DOCUMENTS 843524  7/1939  France .................. 228/124

Primary Examiner—Dennis L. Taylor
Assistant Examiner—J. Russell McBee
Attorney, Agent, or Firm—Randolph A. Smith; Roger L. May

[57] ABSTRACT

A metal to ceramic sealed joint which can withstand wide variations in temperature and maintain a good seal is provided for use in a device adapted to withstand thermal cycling from about 20 to about 1000 degrees C. The sealed joint includes a metal member, a ceramic member having an end portion, and an active metal braze forming a joint to seal the metal member to the ceramic member. The joint is positioned remote from the end portion of the ceramic member to avoid stresses at the ends or edges of the ceramic member. The sealed joint is particularly suited for use to form sealed metal to ceramic joints in a thermoelectric generator such as a sodium heat engine where a solid ceramic electrolyte is joined to metal parts in the system.

11 Claims, 2 Drawing Sheets

METAL TO CERAMIC SEALED JOINT

BACKGROUND OF THE INVENTION

This invention was made under contract with or subcontract thereunder of the Department of Energy Contract No. DE-AC02-83CE40651.

The present invention is directed to an improved design for a metal to ceramic sealed joint, and more particularly to the design of such a joint using active braze material in a thermoelectric generator which is subject to thermal cycling over a wide temperature range.

Thermoelectric generators are known, and their construction and principles of operation have been described, for example, in U.S. Pat. Nos. 4,094,877, 4,098,958, and 4,510,210, among others. The name commonly given to such thermoelectric generators, which electrochemically expand an alkali metal across a solid electrolyte, is "sodium heat engine". Sodium is typically the alkali metal of choice in such devices, and while other alkali metals may be employed, the sodium heat engine which is described herein is exemplary of such generators.

A typical sodium heat engine comprises a closed container separated into first and second reaction zones by a solid electrolyte. Liquid sodium metal is present in the first reaction zone on one side of the solid electrolyte and is maintained, during operation of the engine, at a pressure higher than that of the second reaction zone. In the lower pressure second reaction zone, a permeable, electrically conductive electrode is in contact with the solid electrolyte. During operation of the engine, a heat source raises the temperature of the sodium in the first reaction zone to above its melting point, typically in the range of from about 600 to 1000 degrees C. The high temperature liquid sodium metal also has a corresponding high vapor pressure which creates a sodium vapor pressure differential across the solid electrolyte. In response to this pressure differential, the liquid elemental sodium gives up electrons to an electrode in contact with the sodium metal. The resulting sodium ions then migrate through the solid electrolyte.

The electrons, having passed through an external load, then neutralize sodium cations at the permeable electrode/solid electrolyte interface Elemental sodium metal evaporates from the permeable electrode and migrates through the lower pressure second reaction zone (preferably, a near vacuum space) to a lower temperature condenser. The condensed liquid sodium may then be collected and returned back to the higher temperature first reaction zone to complete the closed cycle. This may be accomplished, for example, by means of a return line and electromagnetic pump.

The materials used in the construction of such sodium heat engines and which come into contact with the solid electrolyte must be able to withstand the typical operating temperatures encountered which are in the range of from about 600 to 1000 degrees C. Further, many of the materials which come into contact with liquid or gaseous sodium must be able to withstand the corrosive qualities of such alkali metals. Additionally, because the first and second reaction zones are maintained at different temperatures and pressures during operation of the sodium heat engine, liquid and vapor tight seals must be maintained in the engine.

Typically, such sodium heat engines utilize a ceramic such as an alkali metal beta alumina as the solid electrolyte material because of its combination of high ionic conductivity and low electronic conductivity properties as well as its ability to withstand the high temperatures and corrosive materials encountered during operation. Metal parts typically utilize tantalum and molybdenum and alloys thereof which can withstand the operating environment found in such devices Assembly of sodium heat engine systems typically requires the attachment of beta alumina solid electrolyte bodies to metal system members. Accordingly, attachment means must also be able to withstand the high temperatures and corrosive environment of the system.

Under such severe conditions, commonly used glass sealing materials do not provide adequate corrosion resistance. Common brazing materials such as molybdenum-manganese, which employ oxide coatings on the ceramic electrolyte member, are not suitable because of the reduction of the oxide coatings by the high temperature liquid sodium. For these reasons, brazing filler materials used in sodium heat engines need to contain an active metal component such as titanium or zirconium to provide good adhesion to the ceramic electrolyte material.

However, even where active metal brazes have been used in the past, problems have arisen in the integrity of seals formed by joining the metal and ceramic parts together. Frequently, such seals have failed due to thermal stress-induced fractures of the ceramic electrolyte material. Hermetically sealed joints have not been possible heretofore because the thermal coefficient of expansion of the active metal brazes is badly mismatched with the ceramic material. The ceramic to metal joints typically must withstand repeated thermal cycling over the range of temperatures from about 20 to about 1000 degrees C.

In the environment of a sodium heat engine, the wide variations in temperatures during repeated thermal cycling of the system leads to severe stresses which can cause joint failure in the initial cycle or as a result of fatigue after repeated cycles. An alkali metal beta alumina, although a good material from a corrosion and high temperature resistance standpoint, is particularly difficult to join with metal system parts since excessive heating in a vacuum or in a controlled nonoxidizing atmosphere can lead to decomposition of the beta alumina at its surfaces. This results in poor ionic surface conduction properties and renders the material unusable for sodium heat engine applications.

Accordingly, there still exists a need in the art for a metal to ceramic braze joint design which can withstand thermal cycling and corrosive environments while maintaining a good seal.

SUMMARY OF THE INVENTION

The present invention meets that need by providing a metal to ceramic sealed joint which can withstand wide variations in temperature and maintain a good seal. In accordance with one aspect of the present invention, a metal to ceramic sealed joint for use in a device adapted to withstand thermal cycling from about 20 to about 1000 degrees C is provided and includes a metal member, a ceramic member having an end portion, and an active metal braze forming a joint to seal the metal member to the ceramic member. The joint is positioned remote from the end portion of the ceramic member to avoid stresses at the ends or edges of the ceramic member.

The present invention is particularly suited for use to form sealed metal to ceramic joints in a thermoelectric generator such as a sodium heat engine where a solid ceramic electrolyte is joined to metal parts in the system. Such a system undergoes repeated thermal cycling and is subjected to corrosive liquid alkali metals during operation.

Typically, in such a sodium heat engine, the ceramic electrolyte is formed into a hollow cylindrical tube which is closed at one end. The ceramic electrolyte tube is then joined at its open end to a metal portion of the system. During operation, the tube is filled with heated liquid sodium. Accordingly, in a preferred embodiment of the invention, the metal member and the ceramic member are both generally cylindrical in shape, and each of the members includes a wall having inner and outer surfaces.

The metal member may have a diameter which is smaller than the ceramic member in which case it is preferred that the metal member have an end portion which flares outwardly toward the inner surface of the wall of the ceramic member when the two members are joined. The active metal braze is positioned to form a joint about the circumference of the flared outer wall of the metal member and inner wall of the ceramic member. The metal member is positioned at a distance from the open end of the ceramic tube so that the braze joint is remote from the end of the tube.

In this manner, the lateral extent of the braze joint is minimized, and the joint does not contact the end of the ceramic tube. This minimizes stress on the open end of the ceramic tube while also minimizing the lateral extent of the braze joint which, in most instances, has a thermal coefficient of expansion mismatch with either or both of the ceramic member and metal member.

In an alternate embodiment of the invention, the metal member has a diameter larger than the ceramic member and has an end portion which flares outwardly away from the outer surface of the wall of the ceramic member. The active metal braze is then positioned in the space between the outwardly flared portion of the metal member and the outer wall of the ceramic member at a position remote from the end of the ceramic member.

In another embodiment of the invention, the ceramic member includes a groove on an inner surface of the wall thereof which is remote from the end of the ceramic member. The joint sealing the metal member to the ceramic member is positioned in the groove, with the metal member sliding into position adjacent the inner wall of the ceramic tube. During brazing, the braze material is confined to the space in and immediately adjacent the groove in the inner wall of the ceramic member to minimize the lateral extent of contact between the braze joint and wall portions of the metal and ceramic members. Alternatively, the ceramic member includes a groove on an outer surface of the wall thereof, and the joint sealing the metal member to the ceramic member is positioned in the groove. In this embodiment, the metal member is designed to have a slightly larger diameter than the ceramic tube and fit over the outer wall of the ceramic tube.

In yet another embodiment of the invention, the metal member has a diameter smaller than the ceramic member and has a raised or embossed portion which extends outwardly toward the inner surface of the wall of the ceramic member. The joint is positioned to seal the embossed portion of the metal member to the inner wall of the ceramic member at a position remote from the end of the ceramic member. By embossing the metal member, machining operations on the ceramic member may be avoided while still minimizing the extent of lateral contact of the ceramic member to the braze joint.

In an alternative embodiment, the metal member may have a diameter larger than the ceramic member and has an embossed portion which extends inwardly toward the outer surface of the wall of the ceramic member. The joint is positioned to seal the embossed portion of the metal member to the outer wall of the ceramic member at a position remote from the end of the ceramic member.

In a further embodiment of the invention, the metal member includes a washer having upper and lower surfaces, with the washer being joined to the metal member and extending outwardly therefrom. The ceramic member includes first and second generally cylindrical portions positioned on opposite surfaces of the washer, and the active metal braze material is positioned on both of the surfaces of the washer to form seals with the first and second portions of the ceramic member. This embodiment of the invention forms a sandwich-type of seal in which the active metal braze appears on both surfaces of the metal washer. Alternatively, the washer may be joined to the end of the metal member, and the same type of sandwich seal may be formed.

In a preferred embodiment of the invention for use in a sodium heat engine, the preferred material for use as the ceramic electrolyte member is an alkali metal beta alumina. The preferred material for the metal member is one which can withstand the high temperature of operation as well as the corrosive environment of the device such as molybdenum, tantalum, niobium, vanadium, or alloys thereof. Finally, a preferred braze material is one which contains an active metal such as one containing titanium, copper, and/or nickel. However, other braze materials having good adherence to the ceramic electrolyte are also within the scope of the invention.

Accordingly, it is an object of the present invention to provide a metal to ceramic sealed joint which can withstand wide variations in temperature and maintain a good seal. This, and other objects and advantages of the present invention, will become apparent from the following detailed description, the accompanying drawings, and the appended claims.

DETAILED DESCRIPTION OF THE PREFERRED EMBODIMENTS

Figure 1:
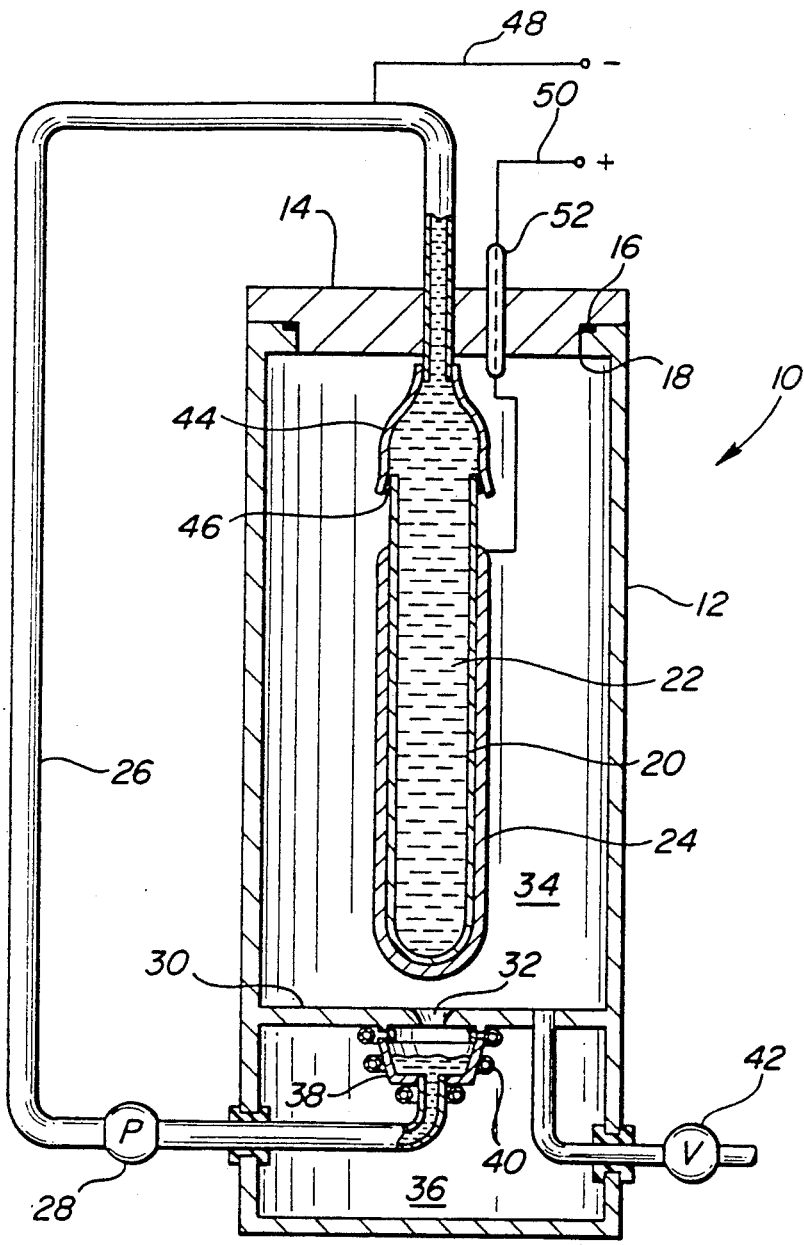
FIG. 1 is a schematic diagram of a typical thermoelectric generator illustrating one embodiment of the ceramic to metal sealed joint of the present invention.

Referring now to FIG. 1, an exemplary thermoelectric generator structure is shown schematically and in vertical cross-section with one embodiment of the metal to ceramic sealed joint of the present invention. As will be apparent to those skilled in the art, the metal to ceramic sealed joints of the present invention may be adapted for use in thermoelectric generators having differing constructions, and the present invention is not limited to use in the specific generator which is depicted. Moreover, the metal to ceramic sealed joints of the present invention may find use in a number of diverse apparatuses where high temperatures, low pressures, corrosive environments, and/or thermal cycling is involved.

As shown in FIG. 1, the generator, generally indicated at 10, is housed in a chemically resistant vessel or chamber 12 fabricated of, for example, stainless steel, ceramic, or the like. A vacuum tight seal of vessel 12 is provided by suitable means such as a cover plate 14 secured by threads or bolts (not shown) and sealed by an O-ring gasket 16 positioned in groove 18.

Positioned inside tube 12 is a smaller tube 20 which comprises the solid electrolyte. Tube 20 is filled partially or completely with an alkali metal 22 such as sodium and forms a first reaction zone. Portions of the outer surface of electrolyte tube 20 are provided with a thin, electrically conductive electrode 24 which is permeable enough to permit sodium to pass therethrough and sufficiently thick and continuous to conduct electricity. Electrode 24 is shown disproportionately thick in relation to other components of the generator to facilitate its location and identification.

Generator 10 also includes a return line 26 which collects liquid alkali metal which has condensed on the inner walls of vessel 12 and returns it to tube 20. An electromagnetic pump 28 is located in return line 26 to pump the recovered liquid alkali metal. Return line 26 is connected to electrolyte tube 20 through metal sleeve 44 which is brazed to ceramic tube 20 at braze joint 46. Braze joint 46, and the various forms which it may take, are discussed in greater detail below.

Near the lower end of vessel 12 is a pressure zone separator 30 which is also preferably fabricated of stainless steel or other chemical and heat resistant material. Pressure zone separator 30 permits discharge of the condensed alkali metal 22 through orifice 32, but maintains a pressure differential between furnace zone 34 and collection zone 36. After passage through orifice 32, the alkali metal 22 is collected as a liquid in condenser trough 38. Condenser trough 38 is welded, or otherwise secured, to separator 30 and is cooled by heat exchange tubes 40.

As is conventional, generator 10 may be equipped with a vacuum pump 42 to reduce the pressure inside vessel 12. Further, generator 10 may be equipped with a heat source to maintain the temperature in tube 20 at least 100 degrees C in excess of the lowest temperature in vessel 12. Such a heat source may comprise a heating device (not shown) immersed in the alkali metal 22 in tube 20.

In operation, vessel 12 is evacuated to a pressure lower than about 0.1 torr, preferably lower than about 0.001 torr, and then sealed. Alkali metal such as sodium within tube 20 is heated to a temperature of from about 300 to 1000 degrees C by suitable means known in the art such as immersion heaters. The portion of vessel 12 near its external walls is maintained at a temperature at least 100 degrees C below that of the alkali metal in tube 20 by means such as thermal exchange with ambient air or other coolant fluids.

A difference in alkali metal vapor pressure on the opposite sides of electrolyte tube 20 results in the creation of a difference in electrical potential across the electrolyte. As electrons flow through an external circuit, schematically shown by negative terminal 48, positive lead 50, and insulator 52, alkali metal 22 passes through electrolyte tube 20 in the form of cations, giving up electrons through negative terminal 48 in the external circuit. The alkali metal cations then accept electrons from electrode 24 and return to their elemental state.

If the portions of vessel 12 near its outer walls are maintained at their desired temperature of at least 100 degrees C lower than the alkali metal in tube 20, elemental alkali metal vapor, which has passed through electrode 24, condenses on those walls. The pressure in vessel 12 becomes the vapor pressure of the alkali metal modified by any pressure drop produced by the mass flow of the alkali metal from electrode 24 to the cooler external walls of vessel 12. In continuous operation, the condensed alkali metal is collected in trough 38 and is returned, via return line 26 and electromagnetic pump 28, tube 20.

In the practice of the present invention, the preferred alkali metal reactant is sodium. However, potassium and other alkali metals may be used if the electrolyte separator tube is of a compatible material. The solid electrolyte tube may be fabricated of glass, ceramic, or polycrystalline ceramic material. Among the ceramic materials which may be used, and which demonstrate an unusually high resistance to attack by alkali metal, are the alkali metal beta aluminas. Such ceramic materials are known in the art and discussed by Saillant, U.S. Pat. No. 4,049,877.

Electrode 24 is permeable enough to permit alkali metal vapors to pass therethrough, but is of sufficient thickness to conduct electricity. It may comprise, for example, a thin conductive layer of titanium nitride as is taught by Novak et al, U.S. Pat. No. 4,714,798. Alternatively, a thin conductive layer of a platinum bright paint comprising platinum chloride, or a molybdenum film applied by sputtering or by other means such as those described in the aforementioned U.S. Pat. No. 4,049,877 may be used.

Figure 2A:
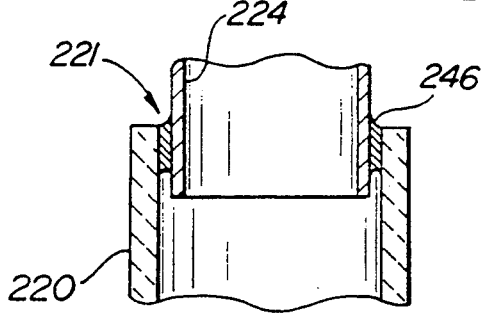
FIGS. 2a and 2b are enlarged cross-sectional views of prior art ceramic to metal sealed joints..
Figure 2B:
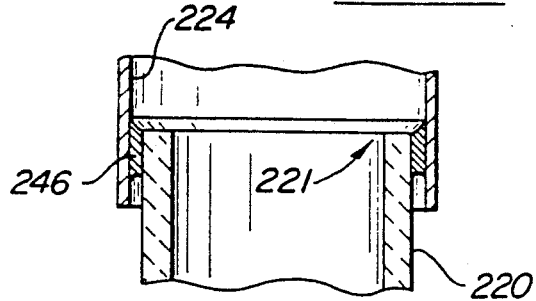

As previously described, one of the major problems in the past with such thermoelectric generators is the maintenance of sealed joints between metal and ceramic parts of the system. FIGS. 2a and 2b illustrate typical prior art ceramic to metal braze joints which have heretofore been used. As can be seen, braze joint 246 between metal sleeve 244 and electrolyte tube 220 has been positioned at the end 221 of the electrolyte tube. Joints made in this manner have frequently failed in the past.

These failures are believed to have been due to thermal stress-induced fractures of the ceramic electrolyte tube at its end or upper corners. The ceramic electrolyte tube is fragile, and the wide range of temperatures to which the braze joint and tube are exposed have led to cracking and failure of the ceramic. Additionally, where an alkali metal beta alumina has been used as the electrolyte material, there have been thermal expansion mismatches between available active metal brazes and the ceramic. The initial heating to form the joint and/or the repeated thermal cycling under wide temperature ranges stress and/or fatigue the ceramic to a point where it fails.

The present invention provides unique designs of hermetically sealed joints to minimize the effects of thermal cycling and coefficient of thermal expansion mismatches on the joints. Each of the joint designs of the present invention minimizes the dimensions of the braze material in those directions most likely to cause excessive thermal stress on the ceramic and metal components of the system. Further, the joints are designed to provide the seal at a position remote from the end and edges or corners of the ceramic electrolyte tube where stresses can be concentrated and lead to failure.

Figure 3A:
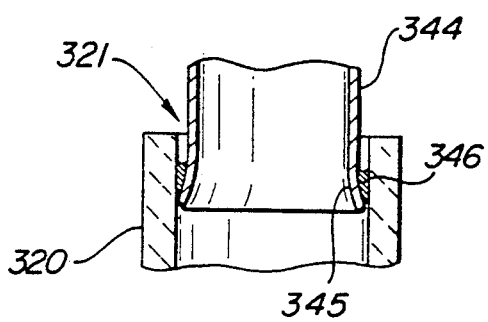
FIGS. 3a and 3b are enlarged cross-sectional views of another embodiment of the ceramic to metal sealed joint of the present invention.
Figure 3B:
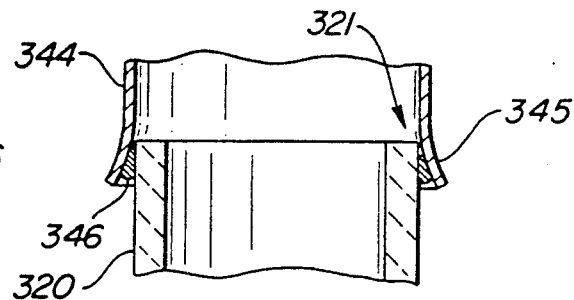

FIGS. 3a and 3b illustrate one embodiment of the invention. As can be seen in FIG. 3a, the metal sleeve 344 has a diameter which is smaller than the ceramic electrolyte tube 320. Metal sleeve 344 has an end portion 345 which flares outwardly toward the inner surface of the wall of ceramic electrolyte tube 320 when the two members are joined. The active metal braze is positioned to form a joint 346 about the circumference of the flared outer wall of metal sleeve 344 and the inner wall of ceramic electrolyte tube 320.

The braze material may be supplied in the form of a powder and secured in position for brazing using a polymeric binder which vaporizes and leaves the joint cleanly when the parts are heated in a vacuum. Care must be taken in forming the joint to minimize the amount of braze material used and to prevent the braze from reaching the end of the ceramic tube. The metal sleeve 344 is positioned at a distance from the open end 321 of ceramic tube 320 so that the braze joint 346 is remote from the end of the tube.

In this manner, the lateral extent of the braze joint 346 is minimized, and the joint does not contact the end 321 of the ceramic tube. This minimizes stress on the open end of the ceramic tube while also minimizing the lateral extent of the braze joint which, in most instances, has a thermal coefficient of expansion mismatch with either or both of the ceramic electrolyte and metal sleeve.

In an alternate embodiment of the invention illustrated in FIG. 3b, metal sleeve 344 has a diameter larger than ceramic tube 320 and has an end portion 345 which flares outwardly away from the outer surface of the wall of ceramic tube 320. The active metal braze is then positioned to form a joint 346 in the space between the outwardly flared portion of metal sleeve 344 and the outer wall of ceramic tube 320 at a position remote from the open end 321 of the ceramic tube.

Figure 4A:
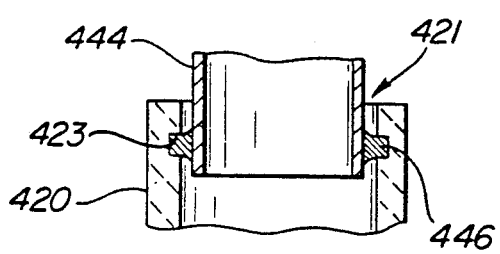
FIGS. 4a and 4b are enlarged cross-sectional views of another embodiment of the ceramic to metal sealed joint of the present invention.

In another embodiment of the invention illustrated in FIG. 4a, ceramic electrolyte tube 420 includes a groove 423 on an inner surface of the wall thereof which is remote from open end 421 of the ceramic tube. Groove 423 may be formed by machining the surface of ceramic tube 420. While the groove is shown as having a generally rectangular cross-section, other cross-sections may be used. The joint 446 sealing generally cylindrical metal sleeve 444 to ceramic tube 420 is positioned in groove 423, with the metal sleeve 444 sliding into position adjacent the inner wall of the ceramic tube. During brazing, the braze material melts, but is confined to the space in and immediately adjacent groove 423 in the inner wall of the ceramic tube 420 to minimize the lateral extent of contact between the braze joint 446 and wall portions of the metal sleeve and ceramic tube.

Figure 4B:
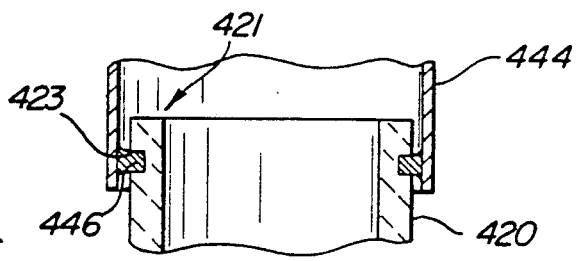

Alternatively, as shown in FIG. 4b, ceramic tube 420 includes a groove 423 on an outer surface of the wall thereof, and the joint 446 sealing metal sleeve 444 to ceramic tube 420 is positioned in the groove 423. In this embodiment, the metal sleeve 444 is designed to have a slightly larger diameter than the ceramic tube 420 and fit over the outer wall of the ceramic tube.

Figure 5A:
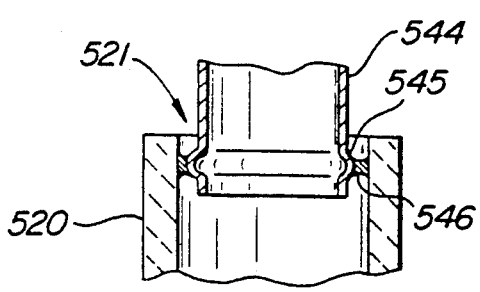
FIGS. 5a and 5b are enlarged cross-sectional views of yet another embodiment of the ceramic to metal sealed joint of the present invention.

In yet another embodiment of the invention illustrated in FIG. 5a, metal sleeve 544 has a diameter smaller than ceramic tube 520 and has a raised or embossed portion 545 which extends outwardly toward the inner surface of the wall of ceramic tube 520. The braze joint 546 is positioned to seal embossed portion 545 of metal sleeve 544 to the inner wall of ceramic tube 520 at a position remote from the end 521 of the ceramic tube. By embossing metal sleeve 544, machining operations on the ceramic electrolyte tube may be avoided while still minimizing the extent of lateral contact of the ceramic tube to the braze joint 546.

Figure 5B:
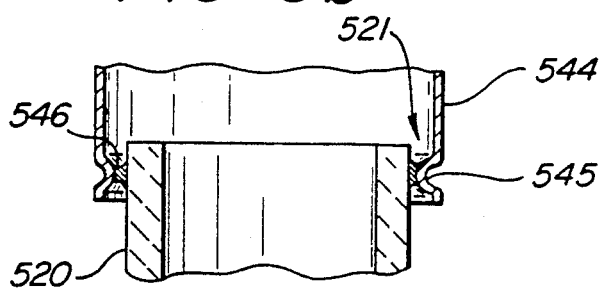

In an alternative embodiment of the invention illustrated in FIG. 5b, metal sleeve 544 may have a diameter larger than ceramic tube 520 and has an embossed portion 545 which extends inwardly toward the outer surface of the wall of the ceramic tube. The braze joint 546 is positioned to seal the embossed portion 545 of metal sleeve 544 to the outer wall of ceramic tube 520 at a position remote from the end 521 of the ceramic tube.

Figure 6A:
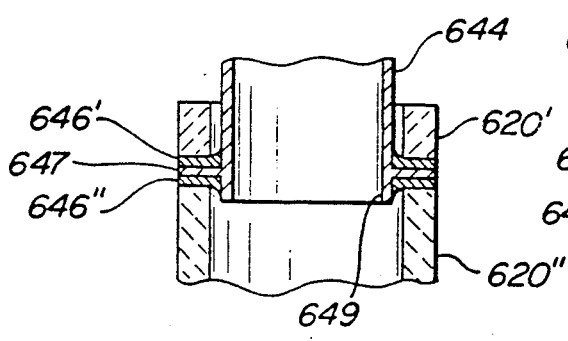
FIGS. 6a and 6b are enlarged cross-sectional views of still another embodiment of the ceramic to metal sealed joint of the present invention.

In a further embodiment of the invention illustrated in FIG. 6a, metal sleeve 644 includes a washer 647 having upper and lower surfaces, with the washer being joined to metal sleeve 644 and extending outwardly therefrom. Washer 647 is positioned remote from the end 649 of metal sleeve 644. The ceramic tube 620 includes first and second generally cylindrical portions 620' and 620", respectively, positioned on opposite surfaces of washer 644, and the active metal braze joint 646 is positioned on both of the surfaces of the washer to form seals 646' and 646", respectively, with the first and second portions 620' and 620" of the ceramic tube. The braze material itself may be supplied in the form of a washer and positioned as indicated prior to heating of the parts to form the hermetically sealed joint.

Figure 6B:
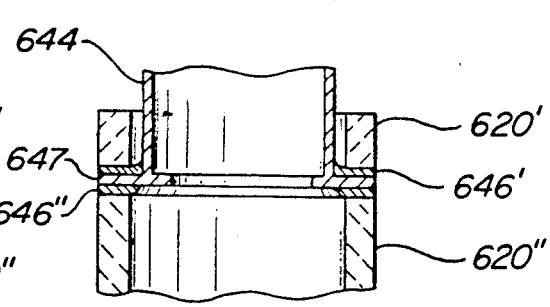

This embodiment of the invention forms a sandwich-type of seal in which the active metal braze appears on both surfaces of the metal washer 647. Alternatively, as illustrated in FIG. 6b, the washer 647 may be joined to the end 649 of metal sleeve 644, and the same type of sandwich seal may be formed.

In a preferred embodiment of the invention for use in a sodium heat engine, the preferred material for use as the ceramic electrolyte member is an alkali metal beta alumina. The preferred material for the metal member is one which can withstand the high temperature of operation as well as the corrosive environment of the device such as molybdenum, tantalum, niobium, vanadium, or alloys thereof. Finally, a preferred braze material is one which contains an active metal such as one containing titanium, copper, zirconium, and/or nickel. A suitable braze is a TiCuNi braze commercially available from GTE Wesgo. However, other braze materials having good adherence to the ceramic electrolyte are also within the scope of the invention.

In order that the invention may be more readily understood, reference is made to the following example, which is intended to illustrate the invention, but is not to be taken as limiting the scope thereof.

EXAMPLE

To test the performance of the joint designs of the present invention, several joints were formed using beta alumina ceramic tubes and metal sleeves of either molybdenum or tantalum. The beta alumina tubes had approximate outside dimensions of 1.4–1.6 cm and inside dimensions of 1.2–1.3 cm, and lengths of about 10–30 cm. The metal sleeves had dimensions approximately matching either the inside or outside dimensions of the ceramic tube, depending on the desired design configuration. The metal sleeves had a wall thickness of approximately 0.002–0.007 inches.

The braze material was supplied in the form of a powder with polymeric binder for those designs shown in FIGS. 3–5 of the drawings. For the sandwich seal design illustrated in FIG. 6, braze washers were cut from a TiCuNi material from GTE Wesgo and were approximately 0.005 inches thick. After heating to melt the braze material and form the joints, the seals were tested for hermeticity. All of the seal designs produced hermetic seals. The joints were then thermally cycled by heating to about 900° C., cooled, and then tested for hermeticity again. Such seal designs have survived 15 thermal cycles without failure.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A metal to ceramic sealed joint for use in a device adapted to withstand thermal cycling from about 20 to 1000 degrees C comprising a metal member having a generally cylindrical wall, the wall of said metal member having an inner and an outer surface, a ceramic member comprised of a beta alumina having a hollow, cylindrical wall and an end portion, the wall of said ceramic member having an inner and an outer surface, and an active metal braze forming a joint to seal said wall of said metal member to said wall of said ceramic member, said joint positioned remote from said end portion of said ceramic member.

2. The metal to ceramic sealed joint of claim 1 in which said metal member has a diameter smaller than said ceramic member and has an end portion which flares outwardly toward the inner surface of the wall of said ceramic member.

3. The metal to ceramic sealed joint of claim 1 in which said metal member has a diameter larger than said ceramic member and has an end portion which flares outwardly away from the outer surface of the wall of said ceramic member.

4. The metal to ceramic sealed joint of claim 1 in which said ceramic member includes a groove on an inner surface of the wall thereof, and said joint sealing said metal member to said ceramic member is positioned in said groove.

5. The metal to ceramic sealed joint of claim 1 in which said ceramic member includes a groove on an outer surface of the wall thereof, and said joint sealing said metal member to said ceramic member is positioned in said groove.

6. The metal to ceramic sealed joint of claim 1 in which said metal member has a diameter smaller than said ceramic member and has an embossed portion which extends outwardly toward the inner surface of the wall of said ceramic member, and said joint is positioned to seal said embossed portion of said metal member to said ceramic member.

7. The metal to ceramic sealed joint of claim 1 in which said metal member has a diameter larger than said ceramic member and has an embossed portion which extends inwardly toward the outer surface of the wall of said ceramic member, and said joint is positioned to seal said embossed portion of said metal member to said ceramic member.

8. The metal to ceramic sealed joint of claim 1 in which said metal includes a washer having upper and lower surfaces, with said washer being joined to said metal member and extending outwardly therefrom, said ceramic member including first and second generally cylindrical portions positioned on opposite surfaces of said washer, said active metal braze material positioned on both of said surfaces of said washer to form seals with said first and second portions of said ceramic member.

9. The metal to ceramic sealed joint of claim 8 in which said washer is joined to the end of said metal member.

10. The metal to ceramic sealed joint of claim 1 in which said metal member is molybdenum, or tantalum, niobium, vanadium, or alloys thereof.

11. The metal to ceramic sealed joint of claim 1 in which said active metal braze material contains titanium, copper, and nickel.

* * * * *

UNITED STATES PATENT AND TRADEMARK OFFICE
CERTIFICATE OF CORRECTION

PATENT NO. : 5,042,847

DATED : August 27, 1991

INVENTOR(S) : John V. Lasecki, Robert F. Novak, James R. McBride

It is certified that error appears in the above-identified patent and that said Letters Patent is hereby corrected as shown below:

In Claim 1, Col. 9, line 37 and 38 "about 20 to 1000" should be
--about 20 to about 1000--.

Signed and Sealed this

Thirtieth Day of March, 1993

*Attest:*

STEPHEN G. KUNIN

*Attesting Officer*  *Acting Commissioner of Patents and Trademarks*